Figure 1:
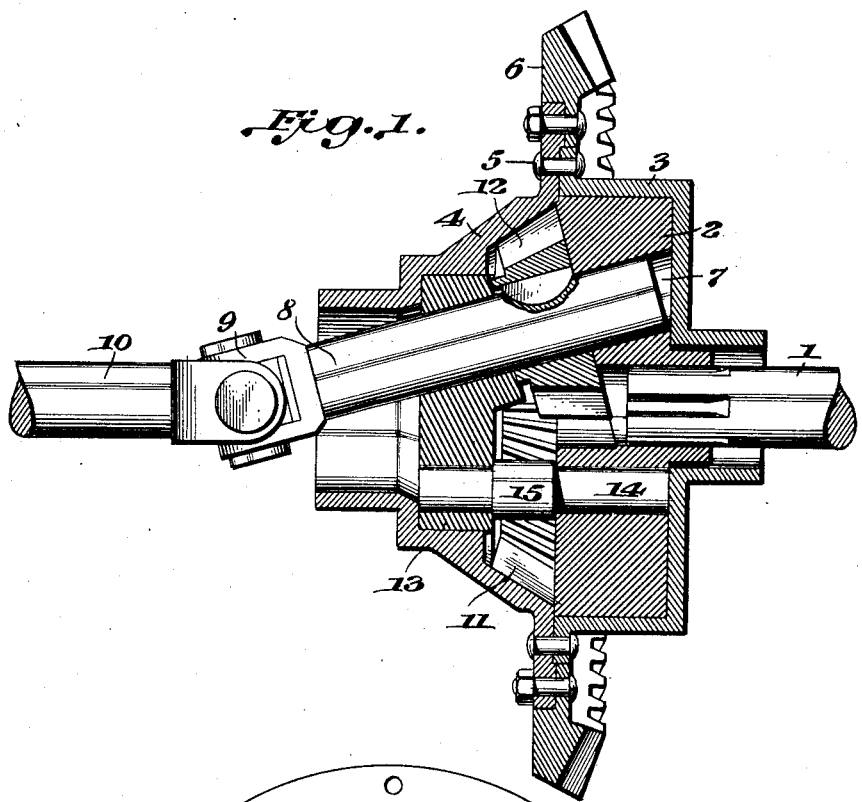

F. V. ELBERTZ.
DIFFERENTIAL MECHANISM.
APPLICATION FILED JAN. 22, 1919.

1,352,590.

Patented Sept. 14, 1920.

INVENTOR
Frank Elbertz

BY
ATTORNEY

UNITED STATES PATENT OFFICE.

FRANK V. ELBERTZ, OF DETROIT, MICHIGAN, ASSIGNOR TO B. F. EVERITT COMPANY, OF DETROIT, MICHIGAN, A CORPORATION OF MICHIGAN.

DIFFERENTIAL MECHANISM.

1,352,590.  Specification of Letters Patent.  Patented Sept. 14, 1920.

Application filed January 22, 1919. Serial No. 272,443.

*To all whom it may concern:*

Be it known that I, FRANK V. ELBERTZ, a citizen of the United States of America, residing at Detroit, in the county of Wayne and State of Michigan, have invented certain new and useful Improvements in Differential Mechanism, of which the following is a specification, reference being had therein to the accompanying drawings.

This invention relates to a differential mechanism or compensating gear for translating motion of a rotating casing or driving member to a pair of follower shafts and for other purposes where such mechanism may be employed.

The invention consists in the matters hereinafter set forth, and more particularly pointed out in the appended claims.

Figure 2:
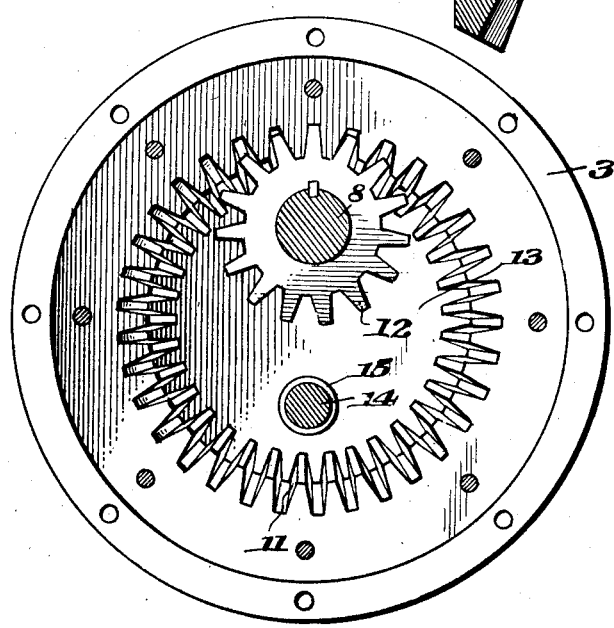

In the drawings,

Figure 1 is a view in longitudinal section, partially broken away and in elevation, of a mechanism that embodies features of the invention; and Fig. 2 is a view partially in cross section and partially in side elevation of a portion of the device.

Referring to the drawing a differential shaft section 1 has a driving bushing 2 keyed or non-rotatably secured thereto with the main body portion forming a bearing for the one part 3 of a driving casing. A companion part 4 is made fast thereto by suitable holding means 5 which pass through the meeting flanges of the parts, a driving gear 6 being mounted non-rotatably on such flanges in any suitable manner.

A bearing recess or journal opening 7 eccentric to the shaft 1 is formed in the bushing 2 and has a support for a wabble shaft 8, which is rotatable therein, a universal joint 9 of any preferred type coupling the wabble shaft with another differential shaft section 10 which may be alined with the section 1. The section 4 of the driving casing which envelops the wabble shaft loosely, carries an internal bevel gear 11 formed on or secured therein with the gear alined or coaxial with the shaft 1, and in mesh with a beveled pinion 12 that is keyed to the wabble shaft 8 or otherwise non-rotatably secured thereon. A steadying bearing block 13 is journaled in a reduced portion of the casing section 3 to aid in maintaining the wabble shaft 8 in alinement, being driven in unison with the bushing 2 by a suitable stud 14 that has an enlarged portion forming a thrust collar 15 which prevents the recession inwardly of the bushing 13 in the casing 4 and provides clearance for the pinion 12, the bushing 2 being counterbored on its inner face at the bearing opening 7 for reception of the pinion 12.

In operation, rotation of the casing drives the bushing 2 and shaft 1 in unison with the shaft 10 and the casing if the resistance on the shaft 10, for example, is sufficient to prevent rotation of the wabble shaft and the pinion 12. If however, the shaft 10 attempts to run ahead as might happen if the differential were used in a vehicle and the sections were connected to traction wheels, the pinion 12 travels ahead on the gear teeth 11 and the power is transmitted through the bushing 2 to the shaft 1. Conversely if the shaft 1 tries to run ahead of the shaft 10, for example, the tendency of the bushing 2 to turn faster than the casing 3 reverses the stress on the pinion 12 and the latter travels correspondingly on the gear teeth 11 and an increased traction is supplied to the shaft 10.

Obviously, changes in the details of construction may be made without departing from the spirit of my invention and I do not care to limit myself to any particular form or arrangement of parts.

What I claim is:—

1. In a differential mechanism, a rotatable casing provided with an internal gear, a bushing journaled in the casing having an eccentric bearing recess, a shaft secured in the bushing coaxial with the gear, a shaft alined with the bushing shaft, a wabble shaft journaled in the eccentric recess and connected to the other shaft by a universal joint, and a bevel pinion on the wabble shaft in mesh with the gear.

2. In differential mechanism, a rotatable driving casing, a pair of alined shafts coaxial therewith and adapted to be driven thereby, an internal bevel gear secured concentrically in the casing, a bushing non-rotatably secured to one shaft and journaled in the casing, a wabble shaft non-rotatably articulated to the other shaft and journaled in an off center bearing of the bushing, and a pinion on the wabble shaft, meshing with the internal gear.

In testimony whereof I affix my signature in the presence of two witnesses.

FRANK V. ELBERTZ.

Witnesses:
O. F. BARTHEL,
ANNA M. DORR.